United States Patent [19]

Königshofen et al.

[11] Patent Number: 4,720,433
[45] Date of Patent: Jan. 19, 1988

[54] RUBBER ARTICLES CONSISTING OF DIFFERENT RUBBER LAYERS, THE PRODUCTION AND USE THEREOF

[75] Inventors: Heinrich Königshofen, Bergisch-Gladbach; Zsolt Szentivanyi, Leverkusen, both of Fed. Rep. of Germany

[73] Assignee: Bayer Aktiengesellschaft, Leverkusen, Fed. Rep. of Germany

[21] Appl. No.: 851,214

[22] Filed: Apr. 14, 1986

[30] Foreign Application Priority Data

Apr. 24, 1985 [DE] Fed. Rep. of Germany ....... 3514697

[51] Int. Cl.$^4$ ..................... B32B 25/12; B32B 27/08
[52] U.S. Cl. ................................... 428/495; 428/494; 428/517; 428/519; 428/520; 428/704
[58] Field of Search ............... 428/517, 519, 520, 494, 428/495, 704

[56] References Cited

U.S. PATENT DOCUMENTS 3,403,072 9/1968 Wheat ................................. 428/517
3,528,473 9/1970 Torti et al. ......................... 428/517

FOREIGN PATENT DOCUMENTS 466676 7/1950 Canada ................................ 428/517

*Primary Examiner*—P. C. Ives
*Attorney, Agent, or Firm*—Connolly & Hutz

[57] ABSTRACT

Rubber articles consisting of at least two layers consisting of at least two different elastomers, the layers being joined tightly together by sulphur vulcanization, are obtained by using a diene rubber as the first elastomer and a hydrogenated NBR-rubber with a degree of hydrogenation of from 85 to 99.7% by weight as the second elastomer, the hydrogenated NBR-rubber having an acrylonitrile content of from 16 to 49% by weight.

3 Claims, No Drawings

RUBBER ARTICLES CONSISTING OF DIFFERENT RUBBER LAYERS, THE PRODUCTION AND USE THEREOF

It is known to construct rubber articles from layers of different elastomers and to join these layers together as tightly as possible in order to make use of the different favourable properties of the elastomers.

Thus, EP-A-No. 89 162 describes a fuel tube with a fluorine rubber inner bore and an outer layer consisting of other elastomers, as fluorine rubber is particularly resistant to liquid hydrocarbons. This tube has on the outside, for example, an EPDM-rubber so that it is particularly ozone resistant. This tube suffers from the disadvantage that only an insufficient adhesion of the EPDM-layer to the fluorine rubber is achieved through vulcanisation and the layers have to be adhered using a special adhesive. Further possible combinations, in particular for tubes, are described in Rubber Chem. and Technology, 56, page 557.

An object of the present invention is the production of rubber articles consisting of at least two layers consisting of at least two different elastomers, the elastomers being hardened by sulphur vulcanisation and being joined to the respective adjacent layer without the use of special chemicals or adhesives.

This object is surprisingly achieved in that a diene rubber is used as the first elastomer and a hydrogenated NBR-rubber with a degree of hydrogenation of from 85 to 99.7% particularly from 94 to 98%, is used as the second elastomer, the hydrogenated NBR-rubber having an acrylonitrile content of from 16 to 49% by weight, particularly from 30 to 45% by weight.

NBR, SBR, CR, BR or NR are used as diene rubbers.

The rubber articles are produced, for example, in that plates which contain all the necessary rubber chemicals but which are unvulcanised are produced from the individual rubbers. Two plates are then placed upon each other and are vulcanised together under slight pressure at a temperature of from 140° to 200° C.

The quantity of sulphur is not critical and can be from 0.1 to 5% by weight, based on the rubber solids.

The rubber articles according to the invention are particularly suitable for the production of rollers, conveyor belts, tubes or belts.

The separation strength is excellent and is of the level of peroxide cross-linking. The rubber articles have, however, the known advantages which are achieved with sulphur vulcanisation.

EXAMPLE

The following elastomers are used:

HNBR I: Hydrogenated butadiene-acrylonitrile copolymer with an acrylonitrile content of 34% by weight, a Mooney viscosity ML 1+4/100° C. of 70 ME and a residual double bond content of 0.5%.

HNBR II: as HNBR I but with a residual double bond content of 5%

NBR I: Butadiene-acrylonitrile-copolymer with an acrylonitrile content of 28% by weight and a Mooney viscosity ML 1+4/100° C. of 45 ME.

NBR II: as NBR I but with 34% by weight of acrylonitrile and a Mooney viscosity ML 1+4/100° C. of 30 ME.

CR I: Polychloroprene with a Mooney viscosity ML 1+4/100° C. of 45 ME.

EPDM I: Terpolymer consisting of ethylene, propylene and 5-ethylidene-2-norbornene with an ethylene content of 46% by weight, a propylene content of 48% by weight and a Mooney viscosity ML 1+4/100° C. of 45 ME.

EPDM II: as EPDM I but with a Mooney viscosity ML 1+4/100° C. of 110 ME.

SBR: Styrene-butadiene-copolymer with a styrene content of 23.5% by weight and a Mooney viscosity ML 1+4/100° C. of 50 ME.

| Mixture No. | 1 | 2 | 3 | 4 | 5 | 6 | 7 | 8 | 9 | 10 |
|---|---|---|---|---|---|---|---|---|---|---|
| HNBR I | 100.0 | 100.0 | 100.0 | — | — | — | — | — | — | — |
| HNBR II | — | — | — | 100.0 | — | — | — | — | — | — |
| NBR I | — | — | — | — | 100.0 | — | — | — | — | — |
| NBR II | — | — | — | — | — | 100.0 | — | — | — | — |
| CR I | — | — | — | — | — | — | 100.0 | — | — | — |
| SBR | — | — | — | — | — | — | — | 100.0 | — | — |
| EPDM I | — | — | — | — | — | — | — | — | 100.0 | — |
| EPDM II | — | — | — | — | — | — | — | — | — | 100.0 |
| Mercaptosilane | — | — | — | 1.4 | — | — | — | — | — | — |
| Silica | 50.0 | — | — | 40.0 | 45.0 | — | — | 45.0 | — | — |
| Aromatic Polyether | — | 5.0 | 5.0 | — | 5.0 | 5.0 | 5.0 | 5.0 | 5.0 | 5.0 |
| ZnO | 2.0 | 3.0 | 3.0 | 3.0 | 4.0 | 3.0 | 5.0 | 4.0 | 3.0 | 3.0 |
| Stearic acid | 0.5 | 1.0 | 0.5 | 0.5 | 1.0 | 1.0 | 1.0 | 1.0 | 1.0 | 0.5 |
| MgO | 10.0 | 3.0 | — | 3.0 | — | — | 4.0 | — | — | — |
| Carbon black N 347 | — | — | 20.0 | — | — | — | — | — | — | 20.0 |
| Carbon black N 762 | — | — | 40.0 | — | — | — | — | — | — | 40.0 |
| Carbon black N 774 | — | 50.0 | — | — | — | 50.0 | 50.0 | — | 50.0 | — |
| Ester (polyglycol) | — | 5.0 | — | — | 10.0 | 5.0 | 5.0 | 10.0 | 5.0 | — |
| Ether-thioether | — | — | — | 5.0 | — | — | — | — | — | — |
| Trioctyltrimellithate | 10.0 | — | — | — | — | — | — | — | — | — |
| ASM I | 0.8 | — | — | 2.0 | — | — | — | — | — | — |
| ASM II | 1.0 | — | — | 1.0 | — | — | — | — | — | — |
| Sulphur (80%) | — | 0.5 | 1.9 | — | 1.9 | 1.9 | — | 1.9 | 1.9 | 1.9 |
| Sulphur (95%) | — | — | — | 0.1 | — | — | — | — | — | — |
| Fatty acid-salt mixture | 1.0 | — | — | — | — | — | — | — | — | — |
| CBS | — | — | 1.8 | — | 1.8 | — | — | 1.8 | — | 1.8 |
| ETU | — | — | — | — | — | — | 0.8 | — | — | — |
| MBT | — | — | 1.5 | — | — | — | — | — | — | 1.5 |
| MBTS | — | — | — | — | — | 1.2 | — | — | — | — |
| MBSS | — | 1.5 | 1.0 | 1.8 | — | — | — | — | 1.5 | 1.0 |
| TMTD | — | 1.0 | 1.5 | 3.0 | — | — | 0.4 | — | 1.5 | 1.5 |
| Triallylisocyanurate | 1.5 | — | — | — | — | — | — | — | — | — |
| Bis-(tert.-butylperoxy- | 8.0 | — | — | — | — | — | — | — | — | — |

-continued

| Mixture No. | 1 | 2 | 3 | 4 | 5 | 6 | 7 | 8 | 9 | 10 |
|---|---|---|---|---|---|---|---|---|---|---|
| isopropyl)-benzene (40%) | | | | | | | | | | |
| Vulcameter 170° C. | | | | | | | | | | |
| t 10 (min) | 2.5 | 5.4 | 2.4 | 3.6 | 5.7 | 3.7 | 2.5 | 6.4 | 4.1 | 1.0 |
| t 70 (min) | 9.0 | 8.2 | 4.7 | 5.2 | 10.7 | 6.5 | 6.3 | 12.9 | 6.9 | 2.2 |
| t 90 (min) | 16.5 | 9.3 | 9.2 | 6.2 | 16.4 | 9.8 | 14.1 | 19.1 | 11.1 | 9.7 |
| F min (cN) | 828 | 137 | 226 | 421 | 316 | 46 | 194 | 204 | 99 | 408 |
| F max (cN) | 9278 | 3276 | 4539 | 7248 | 2956 | 2927 | 5609 | 2366 | 6216 | 7845 |
| Vulcanisation stab. II 170° C. | | | | | | | | | | |
| Vulcanisation time (min) | 20 | 15 | 15 | 15 | 20 | 15 | 20 | 25 | 15 | 15 |
| Tensile strength (MPa) | 25.1 | 16.3 | 28.4 | 38.9 | 17.9 | 14.0 | 15.6 | 13.5 | 5.4 | 12.0 |
| Elongation at break (%) | 490 | 740 | 630 | 450 | 790 | 820 | 330 | 890 | 300 | 210 |
| Tension at 100(%)(MPa) | 2.4 | 2.7 | 3.0 | 3.4 | 1.6 | 2.3 | 5.6 | 0.9 | 3.0 | 5.2 |
| Tension at 200(%)(MPa) | 4.0 | 4.8 | 7.5 | 7.5 | 2.6 | 4.0 | 11.9 | 1.4 | 4.2 | — |
| Pohle structure (N) | — | 157 | — | — | — | 149 | 160 | — | 99 | — |
| Hardness (Shore A) | 73 | 68 | 75 | 72 | 63 | 62 | 72 | 50 | 70 | 80 |

| | | Separation strength in N/25 mm | | | | | | | | |
|---|---|---|---|---|---|---|---|---|---|---|
| | | HNBR I 1 | HNBR I 2 | HNBR I 3 | HNBR II 4 | NBR I 5 | NBR II 6 | CR I 7 | SBR 8 | EPDM I 9 | EPDM II 10 |
| HNBR I | 1 | | | | | 297 | | | 348 | | |
| HNBR I | 2 | 225 | | | | | 207 | 251 | | 0 | |
| HNBR I | 3 | | | | | 273 | | | 182 | | |
| HNBR II | 4 | | | | | 258 | | | 161 | | |
| NBR I | 5 | | | | | | | | | | 29 |
| NBR II | 6 | | | | | | 253 | | | 0 | |
| CR I | 7 | | | | | | | | | 0 | |
| SBR | 8 | | | | | | | | | | 75 |
| EPDM I | 9 | | | | | | | | | | |
| EPDM II | 10 | | | | | | | | | | |

The abbreviations above are defined as follows:
ASMI: Styrenised diphenylamine (Ageing protection agent)
ASMII: Zinc salt of mercaptobenzimidazole (Ageing protection agent)
CBS: Benzothiazyl-2-cyclohexylsulphene amide
ETU: 2-mercaptoimidazoline
MBT: Mercaptobenzimidazole
MBTS: Benzothiazyl disulphide
MBSS: 2-(4-morpholinyldithio)-benzothiazole
TMTD: Tetraethylthiuram disulphide

We claim:

1. Rubber articles fabricated from at least two layers of at least two different elastomers joined tightly together wherein one elastomer layer is acrylonitrile-butadiene rubber, styrene-butadiene rubber, chloroprene rubber, butadiene rubber, or natural rubber and the other elastomer is a hydrogenated acrylonitrile-butadiene rubber with a degree of hydrogenation of from 85 to 99.7% by weight and having an acrylonitrile content of from 16 to 49% by weight.

2. Rubber articles according to claim 1, the hydrogenated acrylonitrile-butadiene rubber having a degree of hydrogenation of from 94 to 98% by weight and an acrylonitrile content of from 30 to 45% by weight.

3. Rubber articles according to claim 1, wherein that the elastomers are hardened with sulphur and are joined to the respective other layer.

* * * * *